United States Patent
Vandenbussche et al.

(10) Patent No.: US 6,536,713 B2
(45) Date of Patent: Mar. 25, 2003

(54) METHOD OF CONTROLLING OR STABILIZING THE ATTITUDE OF A VEHICLE IN SPACE

(75) Inventors: Francis Vandenbussche, Den Haag (NL); Michel Philippe Janvier, Fonsegrives (FR); Antonius Josephus Maria Van Overbeek, Noordwijk (NL); Antony Philip Holt, Hitchin (GB)

(73) Assignee: Agence Spatiale Europeenne, Paris Cedex (FR)

( * ) Notice: Subject to any disclaimer, the term of this patent is extended or adjusted under 35 U.S.C. 154(b) by 0 days.

(21) Appl. No.: 10/084,270

(22) Filed: Feb. 27, 2002

(65) Prior Publication Data

US 2002/0121573 A1 Sep. 5, 2002

(30) Foreign Application Priority Data

Mar. 1, 2001 (FR) .............................. 01 02796

(51) Int. Cl.[7] .............................. B64G 1/24
(52) U.S. Cl. ........................ 244/165; 701/13
(58) Field of Search ............. 244/158 R, 164, 244/165, 171; 318/561; 701/13

(56) References Cited

U.S. PATENT DOCUMENTS

| | | | | |
|---|---|---|---|---|
| 5,123,617 A | * | 6/1992 | Linder et al. | 244/166 |
| 5,201,833 A | * | 4/1993 | Goodzeit et al. | 244/165 |
| 5,308,024 A | | 5/1994 | Stetson, Jr. | |
| 5,850,992 A | * | 12/1998 | Flament et al. | 244/168 |
| 6,020,956 A | | 2/2000 | Herman et al. | |
| 6,089,508 A | * | 7/2000 | Noyola et al. | 244/165 |
| RE37,374 E | * | 9/2001 | Roston et al. | 318/561 |
| 6,298,289 B1 | * | 10/2001 | Lolyd et al. | 244/158 R |
| 6,456,907 B1 | * | 9/2002 | Reckdahl et al. | 244/165 |

FOREIGN PATENT DOCUMENTS

FR 2 670 746 6/1992

* cited by examiner

Primary Examiner—Galen L. Barefoot
(74) Attorney, Agent, or Firm—Alston & Bird LLP

(57) ABSTRACT

A method of controlling the attitude of a vehicle in space relative to three reference axes, the method consisting:

initially in adjusting the attitude of the vehicle in conventional manner to desired angles on the basis of a two-axis detector which points towards a reference heavenly body; and subsequently in adjusting the attitude of the vehicle about the third reference axis by using the speeds of rotation of the reaction wheels which reflect conservation of the total angular momentum of the vehicle to perform an angle measurement about the third axis.

4 Claims, 2 Drawing Sheets

METHOD OF CONTROLLING OR STABILIZING THE ATTITUDE OF A VEHICLE IN SPACE

The invention relates to a method of controlling or stabilizing the attitude of a vehicle in space.

BACKGROUND OF THE INVENTION

In general, the attitude of a space vehicle, such as a satellite, is controlled on the basis of a frame of reference having three axes: a roll axis, a pitch axis, and a yaw axis, and the satellite can be turned about each of these axes, with the magnitude of the turn implemented by the space vehicle about each of these three axes being referred to as the roll, pitch, and yaw angles, respectively.

Document U.S. Pat. No. 5,205,518 discloses a system for controlling the attitude of a space vehicle, and which operates without using gyros. According to that document, the satellite presents substantially zero angular momentum relative to the earth, towards which the yaw axis of the satellite is directed, whereas its roll axis is parallel to the path it is following. In general, the system measures the roll and pitch angles of the satellite by using a detector or a sensor referenced on the earth, and it estimates the yaw angle without measuring it directly. This estimate is based on calculating the values of the roll and yaw torques which are determined from the speeds of rotation of associated reaction wheels by applying equations that are representative of dynamic models for making such an estimate.

Thus, in the prior art, the attitude of the space vehicle is determined about two reference axes on the basis of angle values measured by a sensor pointing towards a heavenly body, whereas the attitude of the vehicle about the third axis is not measured, but is estimated on the basis of predetermined models.

OBJECTS AND SUMMARY OF THE INVENTION

An object of the invention is likewise to design a method of controlling the attitude of a space vehicle without using gyros, and which implements a solution different from the solution used in the above-mentioned prior art, the present solution being based on the observation that the reaction wheels reflect conservation of the total angular momentum of the space vehicle, this making it possible to determine the attitude of the space vehicle about the third reference axis on the basis of a measurement which is obtained by computation based directly on the speeds of rotation of the reaction wheels, and without making use of mathematical models.

To this end, the invention provides a method of controlling the attitude of a vehicle in space relative to three reference axes, about each of which the space vehicle can be caused to turn, wherein, knowing that speeds of rotation of the three reaction wheels reflect the conservation of total angular momentum of the space vehicle, the method consists:

in measuring the angles of rotation of the space vehicle about two of the three reference axes by means of a two-axis detector pointing towards a reference heavenly body, e.g. the sun, in controlling the speeds of rotation of the reaction wheels to set the attitude of the space vehicle initially relative to the desired angles of rotation about these first two reference axes, and then in measuring the speeds of rotation of the three reaction wheels to calculate the components of the vector representative of the non-zero angular momentum of the space vehicle in a transverse plane extending transversally to a line passing through the space vehicle and the reference heavenly body, said transverse plane containing the first two reference axes; and in calculating the angle of rotation of the space vehicle relative to the third reference axis which points towards the reference heavenly body, on the basis of the components of the total angular momentum vector of the space vehicle along the first two reference axes, and in controlling the reaction wheels to adjust the attitude of the space vehicle to take up the desired angle about the third reference axis.

To enable the space vehicle to be controlled about the third reference axis, the method consists in projecting the vector representative of the total angular momentum of the vehicle onto the transverse plane containing the first two reference axes, and in deducing the components of the vector along those two axes in order to compute the angle of said vector relative to one of the first two reference axes.

More precisely, in order to control the space vehicle about the third reference axis, the method consists in calculating a reference angle at a given instant corresponding to the desired angle of the space vehicle about the third reference axis, and then in calculating at each subsequent instant a "current" angle of the space vehicle about the third reference axis to determine how the current angle is varying relative to the reference angle of rotation, and in bringing the value of said current angle to the value of the reference angle by acting on the speeds of rotation of the three reaction wheels.

According to the invention, the method consists in calculating the angle of rotation of the space vehicle about the third reference axis by applying the following formula:

$$\alpha = \arctan 2(H_z/H_y)$$

where $H_z$ and $H_y$ are the respective components of the angular momentum vector of the space vehicle along the two first reference axes.

According to another characteristic of the method, the attitude of the space vehicle about the third reference axis is controlled after controlling its attitude about the first two reference axes.

Thus, according to an important advantage of the invention, the ability to measure the angle of rotation about the third reference axis enables the space vehicle's attitude to be determined more accurately than can be done with the above-mentioned prior art method, where said angle of rotation is merely estimated, as opposed to being calculated.

BRIEF DESCRIPTION OF THE DRAWINGS

Other advantages, characteristics, details of the invention appear from the additional description given below given with reference to the accompanying drawings, that are given purely by way of example, and in which.

MORE DETAILED DESCRIPTION

The purpose of the method of the invention is to control the attitude of a vehicle in space relative to three reference axes X, Y and Z, about each of which the space vehicle can be caused to turn. In conventional manner, attitude is controlled on the basis of the speeds of rotation of three reaction wheels, for example, which wheels are not necessarily aligned with the three reference axes. A reaction wheel can interfere with a plurality of reference axes, in which case a decoupling matrix is used which is also used for determining the rotary torques to be applied to the reaction wheels in order to modify the attitude of the vehicle.

The method is based on the observation that the speeds of rotation of the reaction wheels reflect conservation of the total angular momentum of the space vehicle.

Figure 1:
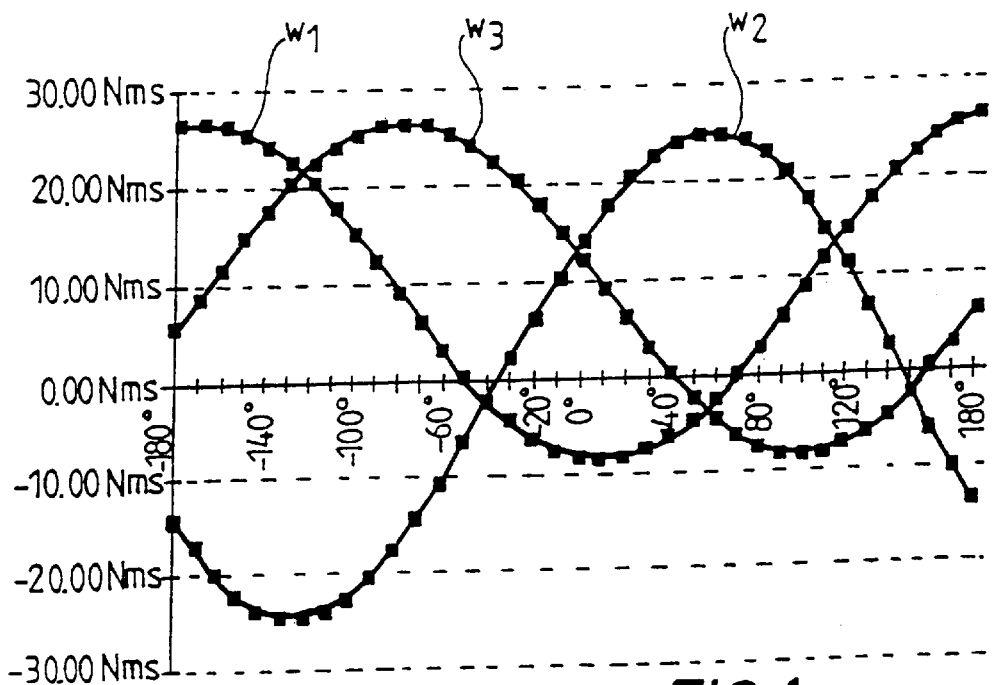
FIG. 1 is a graph showing the speeds of rotation of the three reaction wheels controlling the attitude of the space vehicle in three dimensions.

Thus, starting from an initial angular momentum that is transverse relative to the axis of rotation under consideration, each angular position is represented by a single set of speeds of rotation of the reaction wheels, as is shown in FIG. 1, which plots variation in the speeds of rotation of the reaction wheels during a maneuver through one revolution about one of the reference axes, e.g. the roll axis X.

This example is merely a simulation, and the three reaction wheels W1, W2 and W3 are not in alignment with the three reference axes X, Y and Z, but they are oriented along the following angles:

W1: cos 61.2° relative to X, and
   sin 61.2° relative to Z;
W2: cos 61.2° relative to X, and
   sin 61.2° relative to Y; and
W3: cos 61.2° relative to X, and
   sin 61.2° relative to Z.

It can be seen that the speeds of rotation of all three reaction wheels W1, W2, W3 vary, whereas if the reaction wheels were aligned respectively with the three axes X, Y and Z, then the momentum of the space vehicle about the roll axis X would not vary while the vehicle is turning about said axis.

To describe the method of the invention, it is assumed that one of the reference axes is pointing to a heavenly body, e.g. the sun, and that rotation about this X axis corresponds to the roll angle. The other two reference axes Y and Z are perpendicular to the roll axis and correspond respectively to the pitch angle and to the yaw angle.

In general, the attitude of a space vehicle is initially set relative to two of the three reference axes. More precisely, its attitude is initially set relative to the pitch and yaw axes Y and Z using a two-axis detector pointing towards the sun. Such a Fine Pointing Sun Sensor (FPSS) serves to measure angles of rotation about the pitch and yaw axes Y and Z. Starting from these angles and applying well-known conventional laws, torque values are computed for application to the reaction wheels in order to modify their speeds of rotation and obtain the desired angles relative to the Y and Z axes.

In contrast, the attitude of the space vehicle in terms of roll angle is not controlled on the basis of an estimated value for said angle, but on the basis of a measurement of this angle, which is obtained from the speeds of rotation of the three reaction wheels.

According to the invention, a Coarse Roll Sensor (CRS) is used whose operation is based on the principle of calculating roll angle from the speeds of rotation of the three reaction wheels, given that the speeds of rotation of the space vehicle about the pitch and yaw axes are set to a value that is substantially zero by an Attitude and Orbit Control Subsystem (AOCS) which loads the total momentum of the space vehicle on the three reaction wheels.

More precisely, the total angular momentum of the space vehicle is calculated from the speeds of rotation of its three reaction wheels, and the vector V representing this angular momentum is projected onto a plane transverse to a line passing through the space vehicle and the reference heavenly body, in this case the sun, this transverse plane containing the pitch and yaw reference axes Y and Z.

Figure 2A:
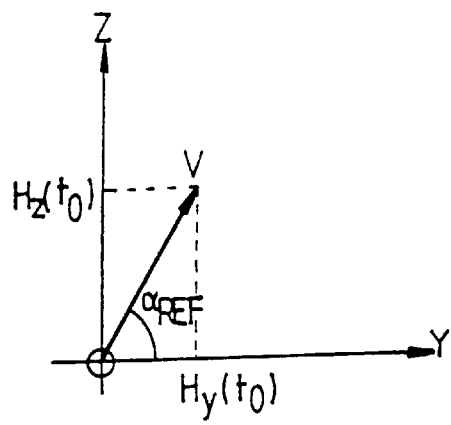
FIGS. 2a and 2b are diagrams for showing the principles on which the angle of rotation of the space vehicle is calculated relative to one of the reference axes.
Figure 2B:
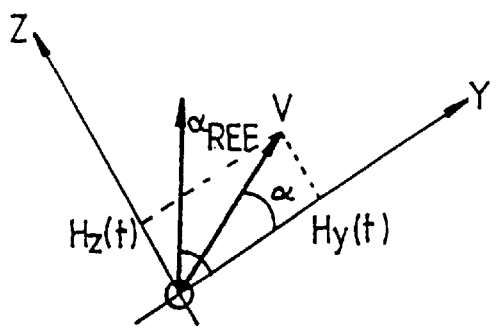

FIG. 2a shows the vector V representative of the total angular momentum M of the space vehicle in the transverse Y, Z plane. This reference vector V presents two components $H_y$ and $H_z$ along the two axes Y and Z, and it makes a reference angle $\alpha_{ref}$ with the pitch axis Y. In FIG. 2b, this reference vector V has been turned through an angle $\alpha$ due to a positive roll movement of the space vehicle.

Thus, the current value of the angle $\alpha$, once calculated, enables the roll angle to be controlled as soon as any change in the value of this angle gives rise to variation in the components $H_y$ and $H_z$ of the vector V, which thus define a new angle $\alpha$.

If the value of this angle is calculated at an instant $t_0$ assuming that a desired roll angle corresponds to a reference angle $\alpha_{ref}$, then any subsequent calculation of this value enables variation of the angle and its difference from the reference angle to be tracked. It is then possible to bring this angle to the reference value by acting on the speeds of rotation of the reaction wheels.

In general, the total angular momentum M of the space vehicle is not entirely inertial, i.e. it is not substantially constant because of the presence of external perturbations, so open loop compensation terms are applied in calculating the reference angle $\alpha_{ref}$ in order to improve the accuracy of the measurements.

Figure 3:
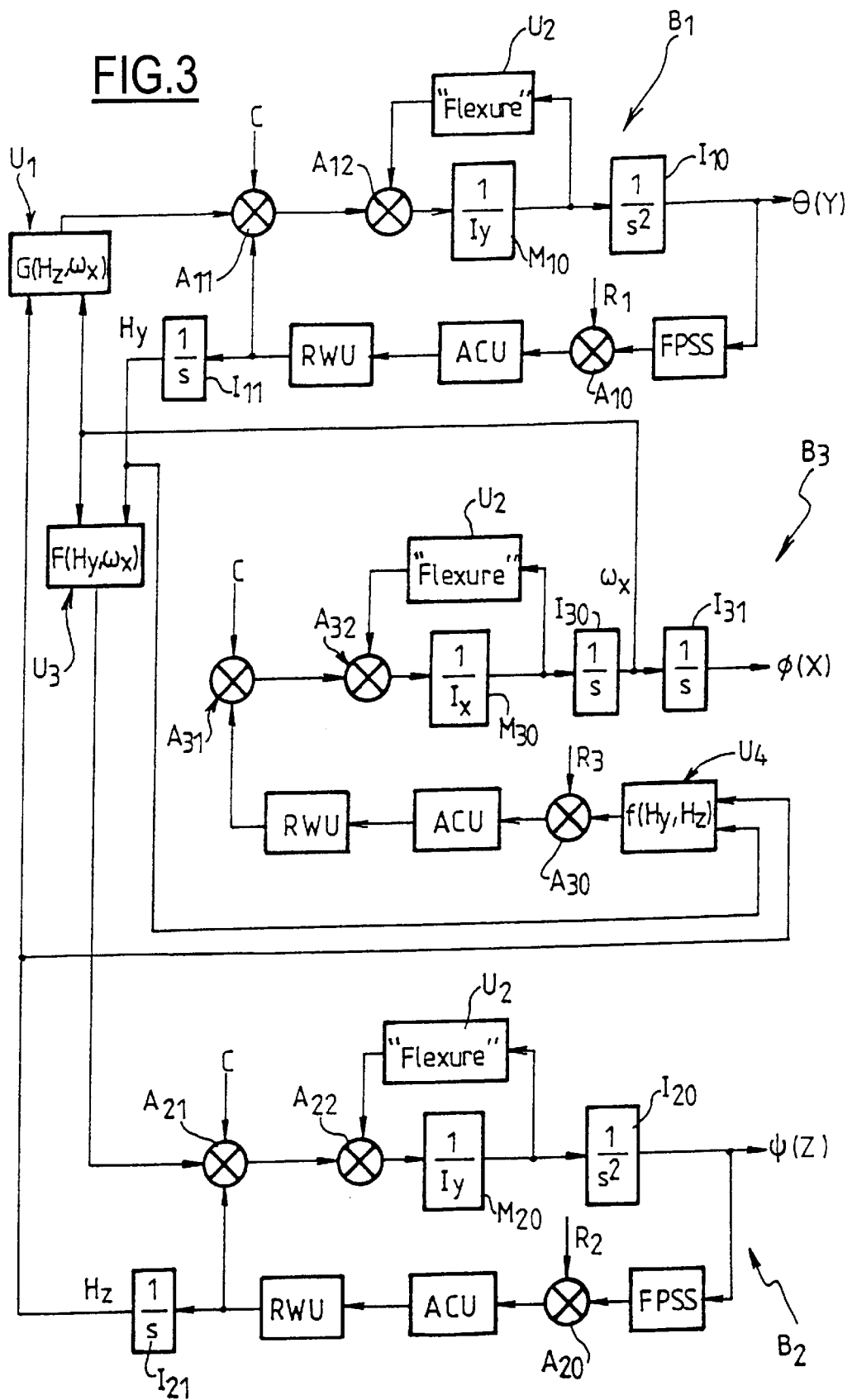
FIG. 3 is a block diagram showing the three control loops for determining the attitude of the space vehicle relative to the three reference axes.

FIG. 3 is block diagram of three control loops for determining the attitude of the space vehicle relative to the roll, pitch, and yaw axes X, Y, and Z, it being understood that the method of the invention is advantageously implemented in software, and the representation in the form of a block diagram is chosen so as to show the interactions between the three loops, given that changing the attitude of the vehicle relative to any one reference axis necessarily requires compensatory changes to be made to the attitude of the vehicle about the other two axes.

The pitch angle $\theta$ about the reference axis Y, as represented by loop B1, is controlled by the FPSS which measures the pitch angle of the space vehicle. On the basis of this angle and of a reference pitch angle R1 which corresponds to the desired angle, as represented by block A10, an automatic control unit ACU is caused to control a reaction wheel unit RWU which applies appropriate torques to act on the speeds of rotation of the reaction wheels so as to obtain the desired attitude in pitch.

The loop B1 also takes account of the real world from a dynamic point of view, in particular the influence of interfering torques C which are induced by the outside environment, and the influence of the gyroscopic torque which corresponds to the coupling effects coming from the other two reference axes X and Z. More precisely, the gyroscopic torque U11 about the reference axis Y is computed in block U1 and corresponds to the product $(W_x \cdot H_z)$, i.e. the product of the angular speed of rotation of the space vehicle about the reference axis X multiplied by the component of the total angular momentum of the vehicle along the reference axis Z.

The set of torque components to which the space vehicle is subjected along the reference axis Y is taken into account in block A11 so as to deduce the value of the resulting torque, and then the value of the pitch angle $\theta$ corresponding to said resulting torque in block I10, where angular acceleration along the pitch axis Y (itself computed in block M10) is subjected to double integration.

Furthermore, account is also taken of the flexible appendages of the space vehicle, such as its solar panels, for example, which have resonant frequencies which must not be excited, and this is represented by a "flexure" block U2 which makes it possible in block A12 to define the torque value of the space vehicle along the reference axis Y that needs to be taken into account in order to deduce the value of the pitch angle θ.

The loop B2 for controlling the yaw angle ψ is generally similar to the above-described loop B1, i.e. the yaw angle ψ is controlled by the FPSS which measures the yaw angle of the space vehicle.

Starting from this angle and a reference yaw angle R2, as represented by block A20, an automatic control unit ACU is operated to control a reaction wheel unit RWU, which acts on the speeds of rotation of the reaction wheels.

Account is also taken of the outside environment in a block A21, together with the gyroscopic torque U3 which corresponds to the coupling effects coming from the other two reference axes X and Y, this coupling being computed in the block U3 by taking the product ($W_x \cdot H_y$) of the angular speed of rotation of the space vehicle about the reference axis X multiplied by the component of the angular momentum of the space vehicle along the reference axis Y.

The set of torques is taken into account in the block A22, so as to deduce therefrom both the value of the resultant torque, and then the value of the yaw angle ψ in the block I20, where the angular acceleration along the yaw axis Z (as calculated in the block M20) is subjected to double integration, while also taking account of the flexible appendages in a block U2.

The control loop B3 for controlling the roll angle φ along the third reference axis X is based on this angle φ being measured in the block U4, and this measurement is based on calculating the value of the current angle α, as explained above with reference to FIGS. 2a and 2b, i.e.:

$$\alpha = \arctan 2(H_z/H_y)$$

where the current angle α which corresponds to the angle of a component of the vector V representative of the total angular momentum M of the space vehicle in the (Y, Z) plane, as explained above with reference to FIGS. 2a and 2b.

The angle α is computed in the block U4, and the following block A30 takes account of a reference R3 corresponding to the reference angle $\alpha_{ref}$, which is representative of the desired roll angle φ, so as to drive the attitude control unit ACU to cause the reaction wheel unit to apply the necessary torques to the reaction wheels so as to bring the value of the current angle α to a value which is close to $\alpha_{ref}$.

What is claimed is:

1. A method of controlling the attitude of a vehicle in space relative to three reference axes, about each of which the space vehicle can be caused to turn, wherein, knowing that speeds of rotation of the three reaction wheels reflect conservation of total angular momentum of the space vehicle, the method comprising:

measuring the angles of rotation of the space vehicle about two of the three references axes by means of a two-axis detector pointing towards a reference heavenly body, controlling the speeds of rotation of the reaction wheels to set the attitude of the space vehicle initially relative to the desired angles of rotation about these first two reference axes; and then measuring the speeds of rotation of the three reaction wheels to calculate the components of the vector representative of the non-zero angular momentum of the space vehicle in a transverse plane extending transversally to a line passing through the space vehicle and the reference heavenly body, said transverse plane containing the first two reference axes; and calculating the angle of rotation of the space vehicle relative to the third reference axis which points towards the reference heavenly body, on the basis of the components of the total angular momentum vector of the space vehicle along the first two references axes, and controlling the reaction wheels to adjust the attitude of the space vehicle to take up the desired angle about the third reference axis.

2. A method according to claim 1, comprising projecting the vector representing the total angular momentum of the space vehicle onto the transverse plane containing the first two reference axes, and deducing therefrom the components of the vector to calculate the angle of the vector relative to one of the two first reference axes.

3. A method according to claim 2, comprising calculating a reference angle at a given instant corresponding to the desired angle of the space vehicle about the third reference axis, and then calculating at each subsequent instant a "current" angle of the space vehicle about the third reference axis to determine how the current angle is varying relative to the reference angle of rotation, and bringing the value of said current angle to the value of the reference angle by acting on the speeds of rotation of the three reaction wheels.

4. A method according to claim 2, comprising calculating the angle of the space vehicle about the third reference angle by applying the following formula:

$$\alpha = \arctan 2(H_z/H_y),$$

where $H_z$ and $H_y$ are the respective components of the angular momentum vector of the space vehicle along the two first reference axes.

* * * * *